United States Patent
Cohen

(10) Patent No.: US 10,003,940 B1
(45) Date of Patent: Jun. 19, 2018

(54) CALL FORWARDING AND ROUTING BACK TO PHONE AFTER CONTACT LIST UPDATE

(71) Applicant: TelTech Systems, Inc., South Amboy, NJ (US)

(72) Inventor: Meir Cohen, Toms River, NJ (US)

( * ) Notice: Subject to any disclaimer, the term of this patent is extended or adjusted under 35 U.S.C. 154(b) by 0 days. days.

(21) Appl. No.: 15/363,104

(22) Filed: Nov. 29, 2016

(51) Int. Cl.
*H04W 4/16* (2009.01)
*H04M 3/54* (2006.01)
*H04M 3/42* (2006.01)

(52) U.S. Cl.
CPC ......... *H04W 4/16* (2013.01); *H04M 3/42042* (2013.01); *H04M 3/42195* (2013.01); *H04M 3/54* (2013.01)

(58) Field of Classification Search
CPC ..... H04W 4/16; H04M 3/54; H04M 3/42195; H04M 3/42042
See application file for complete search history.

(56) References Cited

U.S. PATENT DOCUMENTS

| | | | | |
|---|---|---|---|---|
| 8,781,453 | B1* | 7/2014 | Belford | H04M 3/42042 455/412.1 |
| 2004/0190698 | A1* | 9/2004 | Kowalski | H04M 3/42042 379/142.06 |
| 2004/0264438 | A1* | 12/2004 | Oldham | H04L 29/06027 370/352 |
| 2011/0287810 | A1* | 11/2011 | Zelber | H04M 1/56 455/566 |
| 2011/0311036 | A1* | 12/2011 | Cohen | H04M 3/545 379/142.01 |
| 2014/0051412 | A1* | 2/2014 | Martin | H04M 1/57 455/415 |

* cited by examiner

*Primary Examiner* — Kamran Afshar
*Assistant Examiner* — Minjung Kim
(74) *Attorney, Agent, or Firm* — Michael J. Feigin, Esq.; Feigin and Fridman

(57) ABSTRACT

A call is received by a device without, or with limited, information about the calling party. The call is then forwarded to another device where more calling party information is determined (such as by using the automated number information (ANI) protocol or a database of information associated with phone numbers). These additional data are sent to the device of the called party and are used to populate a contact list on the device with these additional data. Then the call is forwarded to the called party again, and the device of the called party now reports the data stored in the contact list in response to receiving the call.

19 Claims, 4 Drawing Sheets

CALL FORWARDING AND ROUTING BACK TO PHONE AFTER CONTACT LIST UPDATE

FIELD OF THE DISCLOSED TECHNOLOGY

The disclosed technology relates generally to call forwarding and, more specifically, to populating a contact list before forwarding a call back to a called party.

BACKGROUND OF THE DISCLOSED TECHNOLOGY

The ability to block and/or spoof caller ID information, while oftentimes legitimate, is problematic, such as when the caller is pranking or harassing the party he or she is calling. If the party is calling an emergency service and is disconnected before relaying important information about the emergency, this is further problematic. Unfortunately, for non-Inward WATS subscribers (i.e., those without toll-free service), in such instances, it is difficult or impossible to determine who is calling in a timely fashion.

Still further, even if one has an accurate phone number of the calling party, one does not always have the name of the party. This information might be obtainable from other databases or sources, but is not necessarily provided along with the caller ID information. Solutions to this problem have been found by the inventors, including in their U.S. Pat. Nos. 8,369,508, 9,270,816, and others which involve routing calls to an Inward WATS number and back to the called party. This solution allows an accurate number of a calling party to be displayed to the called party; however, this typically uses the caller ID (calling line identification) protocol to populate the data with ANI information.

As some telecommunication companies have caught up with the problems of insecure caller ID, a problem with the above system has arisen in recent years, in that caller ID information cannot be populated with additional information on a receiving device of a called party. Some phones, notably phones from Apple Computer, at the time of this writing, simply only support a number in Caller ID and do not support displaying additional Caller ID information for a call. Thus, new methods are needed to provide a called party with true, accurate, and/or additional information about a calling party beyond simply the calling party's phone number.

SUMMARY OF THE DISCLOSED TECHNOLOGY

A method of determining information associated with a calling party has, in one embodiment, the following steps in order or in a different order. A first phone call from a calling party is received by a handheld wireless device associated with a called party. The call is then forwarded via a first distinct forwarding (wherein "distinct" refers to a first action causing an active phone call to be sent to another receiving hub, device, or party of the phone network) over the phone network to a third party service provider. The third party service provider is a device other than the device of the called party. The called party is defined as a person or device with a distinct phone number or location on a network with identifying information used to access the device (e.g., internet protocol address, phone number, user name, or identification number in a database). Contact data are received from the third party service provider having at least one, or a combination of, a phone number, name, address, and other information which is associated with the calling party. This information can be caller identification information, ANI information (automated number identification) or otherwise. A contact list database stored on the handheld wireless device associated with the called party is populated with at least some of these data.

A second phone call is then made from the calling party to the called party. From the perspective of the called party, this is a second phone call, because a second distinct opening of a communication channel to the called party, though, in embodiments of the disclosed technology, a communication channel from a device associated with the calling party to a telephone network remains open throughout. Thus, the calling party may not have knowledge or receipt of data indicating that communication channels have been opened and closed to the called party throughout the carrying out of methods described herein. Upon receipt of this second call, the handheld wireless device associated with said called party displays more contact data in response to receiving the second phone call than to receiving the first phone call, due to (as a result of) carrying out the step of populating the contact list database. This can be because the device associated with the called party displays information from the contact list when receiving a phone call where the number associated with the phone call is found in the contact list. A "contact list," for purposes of this disclosure, is defined as a stored database with, at least, phone numbers and names. Any of the contact data described in this disclosure can be stored in the contact list database. The contact data can include Automatic Number Identification (ANI) information associated with said calling party. This database can be stored on the device associated with the called party or a remote data storage device for which the device associated with the called party has at least some access there-to.

The second phone call, in embodiments of the disclosed technology, is received based on the first phone call being forwarded back to the handheld wireless device associated with the called party; this forwarding (a second distinct forwarding) can be carried out by the third party service provider. The calling party can disconnect from the first phone call before making the second phone call. In such a case, the step of populating can take place after the first phone call is received, but before the second phone call is received to the handheld wireless device associated with the called party. Or, the calling party can remain connected to the telephone network in a first phone call throughout both calls to the called party.

The first distinct forwarding can be forwarding to voicemail based on rejection of the call by the called party. This rejection can be by way of entering input into the device of the called party or by way of non-answering of the call after a period of time. In addition, or instead, the forwarding can be based on unsatisfactory calling number identification information as part of an automated detection process (e.g., the caller ID information is not populated or is listed as unknown).

The receiving of data can be via a packet-switched data network connection while the phone call is received, both the first and the second time, over a telephone network. After the second phone call is completed, the handheld wireless device associated with the called party can prompt a user thereof to permanently save the contact data in the contact list or delete the contact data from said contact list. In some embodiments, after said second phone call is completed, the contact data are deleted from the contact list automatically or upon manual input/selection by a person operating the device associated with the called party.

A method of receiving a phone call can also be carried out based on receiving a first phone call to a device, the call originating from a calling party. From a perspective of this device, input into the device is then received, or a lack of receiving indicates a non-answering of the phone call, causing forwarding of the first phone call to a third party. Then, from the third party, packet-switched data are received, indicating at least a name and phone number of the calling party. The device determines if the phone number is stored in contacts, and then one of two outcomes occurs. If the phone number is not found in the contacts, the number is stored in the contacts (a list of phone names associated with other information, such as names and pictures, stored on the device), and the phone call from the calling party is received a second time by the device. If the phone call is found in the contacts (such that it existed in the contacts before the first call was received), then the call may not be forwarded a second time to the called party (since the calling party is already known to the called party).

If the phone number is found in the contacts, the third party can be notified of same. The third party can then use this information to refrain from re-sending the call to the called party. Upon such notification, instead, the third party can send the call to voicemail.

The first phone call and the second phone call are one continuous phone call from a perspective of the calling party, but two separately received calls from a perspective of the called party, in embodiments of the disclosed technology. The first phone call and the second phone call are two separate phone calls, each having different telephone network paths between the calling party and the called party, and the name associated with the calling party is displayed by the device upon receipt of the second phone call, in embodiments of the disclosed technology. In such embodiments, the device fails to display the name associated with the called party as a result of receiving the first phone call. The name or names displayed during the second call can be from Automatic Number Identification (ANI) information associated with the calling party.

After the second phone call is completed, in some embodiments, the device associated with the called party prompts a user thereof to permanently save the phone number in the contacts or delete the contact data from the contact list. Before the step of storing, the device associated with the called party displays less caller information (in comparison to the following), and, only after the second phone call, and the device associated with said called party displays at least some of said data stored in said contact database which was stored during the step of storing.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A call is received by a device without, or with only limited information about the calling party. The call is then forwarded to another device, where more calling party information is determined (such as by using the automated number information (ANI) protocol or a database of information associated with phone numbers). These additional data are sent to the device of the called party and used to populate a contact list on the device with these additional data. Then the call is forwarded to the called party again, and the device of the called party now reports the data stored in the contact list, in response to receiving the call.

Embodiments of the disclosed technology are described below, with reference to the figures provided.

Figure 1:
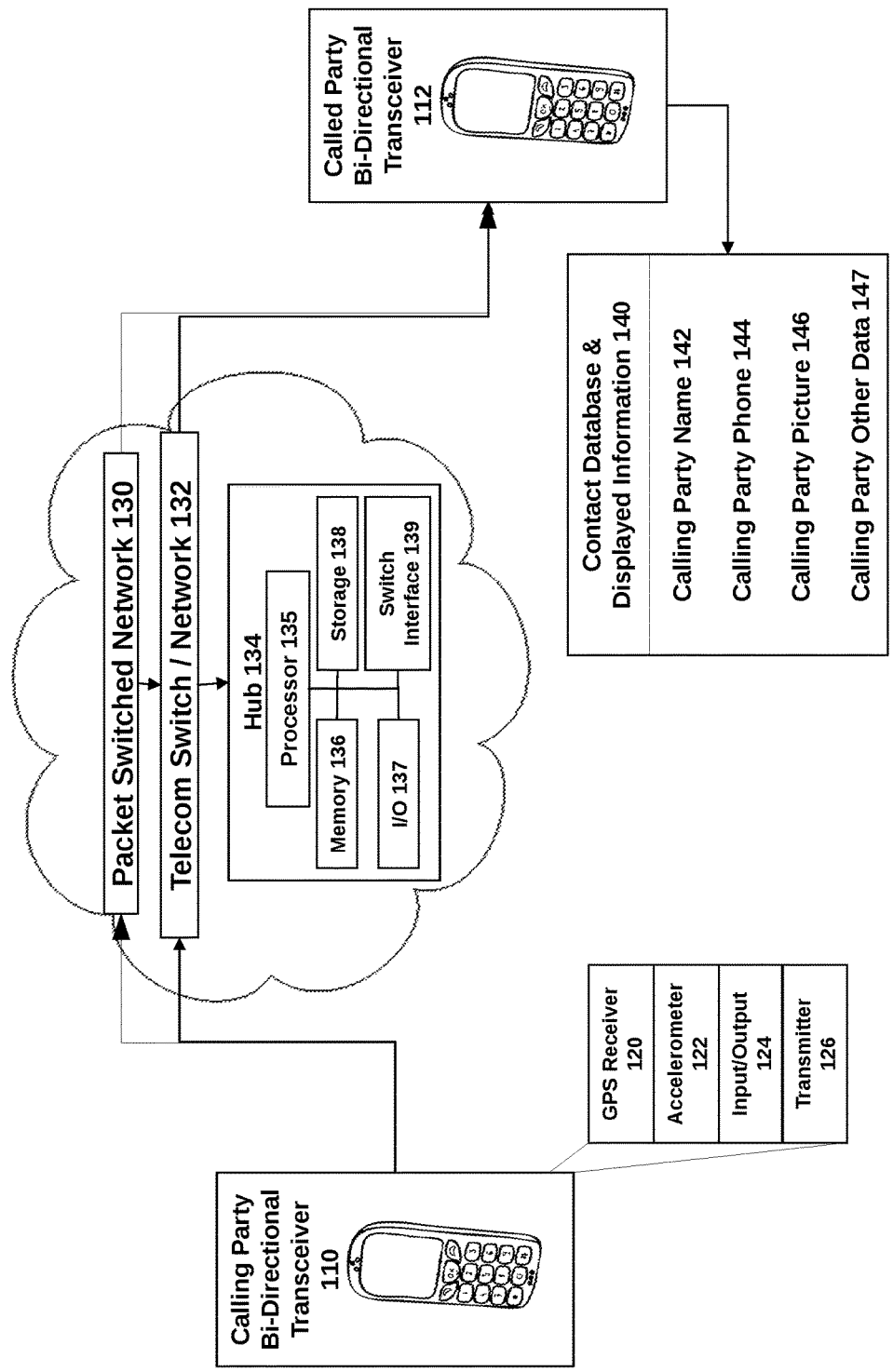
FIG. 1 is a high level block diagram of devices which are used to carry out embodiments of the disclosed technology.

FIG. 1 shows a high level block diagram of devices which are used to carry out embodiments of the disclosed technology. A bi-directional transceiver 110 associated with a calling party is shown, as well as such a transceiver 112 associated with a called party. Each has some or all of the following elements: a GPS receiver 120, an accelerometer 122, input/output mechanisms 124, and a transmitter 126. The GPS (global positioning system) receiver 120 is a global positioning system receiver which receives data from global navigation satellites to determine location and reports this location information. The accelerometer 122 measures acceleration and, indirectly, distance, based on time at a rate of acceleration. Other location determination devices which can be used include the Internet protocol (IP address) of one of the bi-directional transceivers 110 and/or 120. Further, location can be determined based on which cellular tower (terrestrial transmitter) is used.

The input/output 124 refers to a keyboard, touch screen, display, and the like, used to receive input and send output to a user of the device. A transmitter 126 enables wireless transmission and receipt of data via a packet-switched network, such as packet-switched network 130. This network, in embodiments, interfaces with a telecommunications switch 132 which routes phone calls and data between two of the bi-directional transceivers 110 and 120. The devices 110 and 112 also communicate directly with a telephone switch or telephone network 132, in embodiments of the disclosed technology. Versions of these data, which include portions thereof, can be transmitted between the devices. A "version" of data is that which has some of the identifying or salient information as understood by a device receiving the information. For example, a GPS receiver 120 may report location data in one format, and a version of these data can be reported via the packet-switched network 130 to a server. Both versions comprise location identifying data, even if the actual data are different in each case.

Referring again to the telecom switch 132, a device and node where data are received and transmitted to another device via electronic or wireless transmission, it is connected to a hub 134, such as operated by an entity controlling the methods of use of the technology disclosed herein. This hub has a processor 135 deciding how the bi-directional transceivers 110 and 112 are matched to each other or send/receive phone calls, as well as forward the phone call to other locations on the telephone network 132. This hub 134 further has memory 136 (volatile or non-volatile) for temporary storage of data, storage 138 for permanent storage of data, and input/output 137 (like the input/output 124), and an interface 139 for connecting via electrical connection to other devices.

Still discussing FIG. 1, the device of the called party, device 112, has stored there-on a contact list stored in volatile or non-volatile memory. This list of contacts 140 is a stored database with phone numbers and associated data related to the phone number 142 of the calling party, such as a name 142, location, picture 146, or additional information 147. Whether these data exist for a particular calling party 110 or not affects how a call coming in, or rejected, by the called party, is handled. If the phone number of a particular calling party 110 is already stored in the contact list or database 140, then the call, in embodiments of the disclosed technology, is sent to voicemail. If it is not, then a third party, such as a device connected to or at the telecom switch, attempts to find the data, as will be discussed with reference to FIG. 2, and then sends the data over the packet-switched (data) network 130 to the device of the called party which populates (adds) the data related to the calling party number 140 (and at least one of name 142, picture 146, or other data 147) to the contact list. The phone call is then sent back over the telecom switch or telecom network 132 to the called party a second time. Upon receipt of the call, the device associated with the called party now displays information about the called party, based on a phone number lookup, stored in the contact database.

Figure 2:
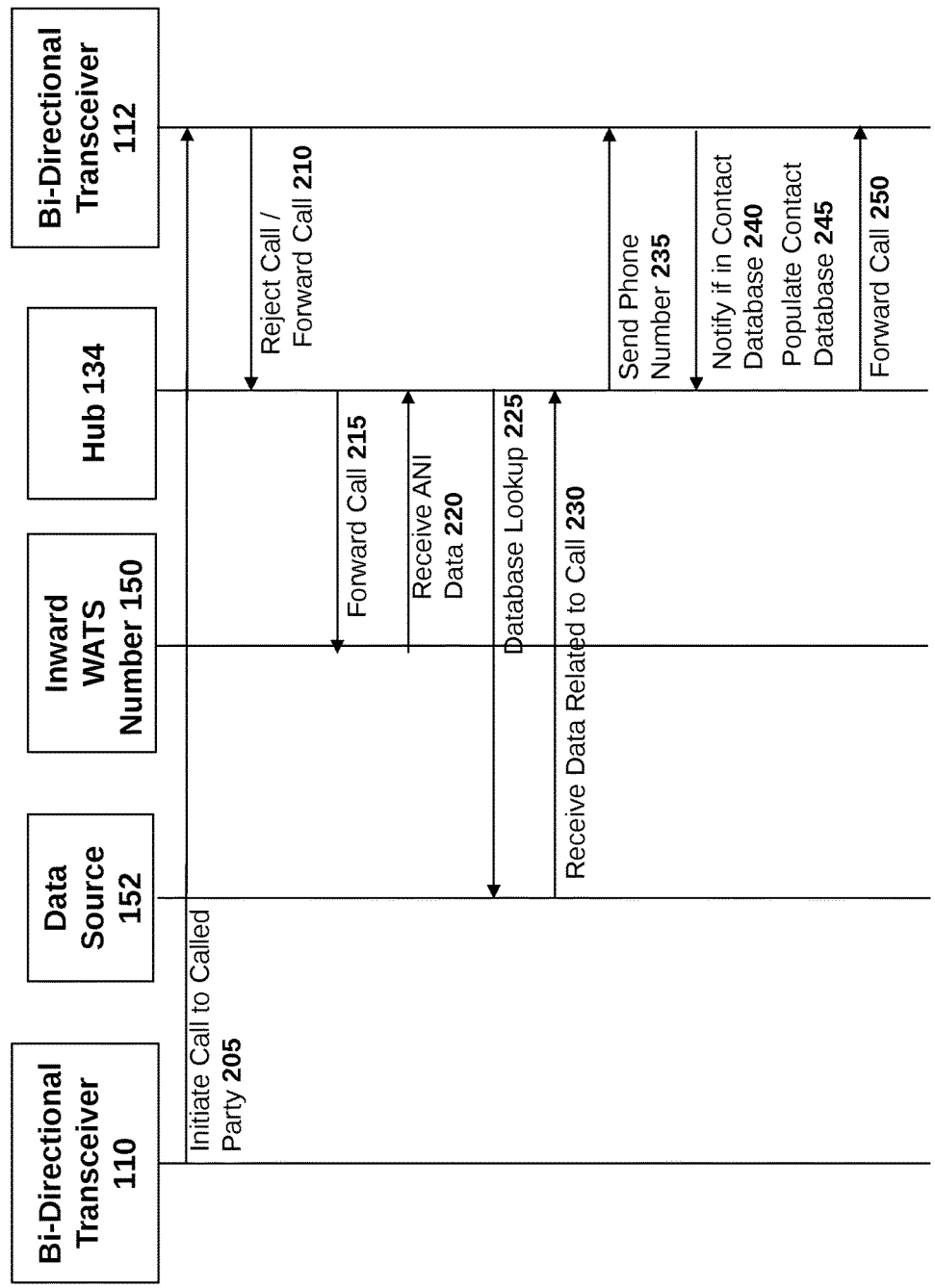
FIG. 2 is a diagram of devices used to carry out steps of the disclosed technology.

FIG. 2 shows a diagram of devices used to carry out steps of the disclosed technology. The bi-directional transceiver 110 is the device associated with a calling party, which, in step 205 initiates a call to the bi-directional transceiver 112. This call is received by the bi-directional transceiver 112 and rings to this device. The called party (operator of the bi-directional transceiver 112) then rejects the call in step 210, causing it to be forwarded to another phone line, such as a forwarding to voicemail. This rejected call is received at a hub 134 (located on the data and/or telecom network) which then ascertains data about the calling party. This is accomplished by forwarding the call in step 215 to an inward WATS telephone number, in some embodiments. The Inward WATS telephone number reports on the ANI information and sends it back to the hub 134 in step 220. In addition, or instead, the hub 134 conducts a database lookup of the phone number, user identification, name, or location of the calling party reported through any of the prior steps described, or data provided by the device of the calling party at the time of the call. These received data, which can include a name, picture, profile of a social media account (or data stored-therein) is sent back to the hub in step 230.

In step 235 the phone number is sent to the called party. This step occurs either after step 220 or in conjunction with sending the data received in steps 220 and 230 to the called party. Immediately after this step is conducted (that is, after the phone number or other data associated with the called party is received by the bi-directional transceiver 112), in some embodiments the called party device notifies the hub 134 (a third party) if the contact is in the database (contact list) of the device 112. If there are new or additional data about the calling party which are found and not previously known to the called party, then the device of the called party populates the contact database with this information in step 245, and the call is again sent to the called party in step 250. The device of the called party 112 then shows this information in response to the call coming in again. Otherwise, it is assumed, in some embodiments of the disclosed technology, that since the called party already knew the phone number and had the calling party in its contacts, they did not want to receive the call from this person, and the call is instead sent to voicemail.

Figure 3:
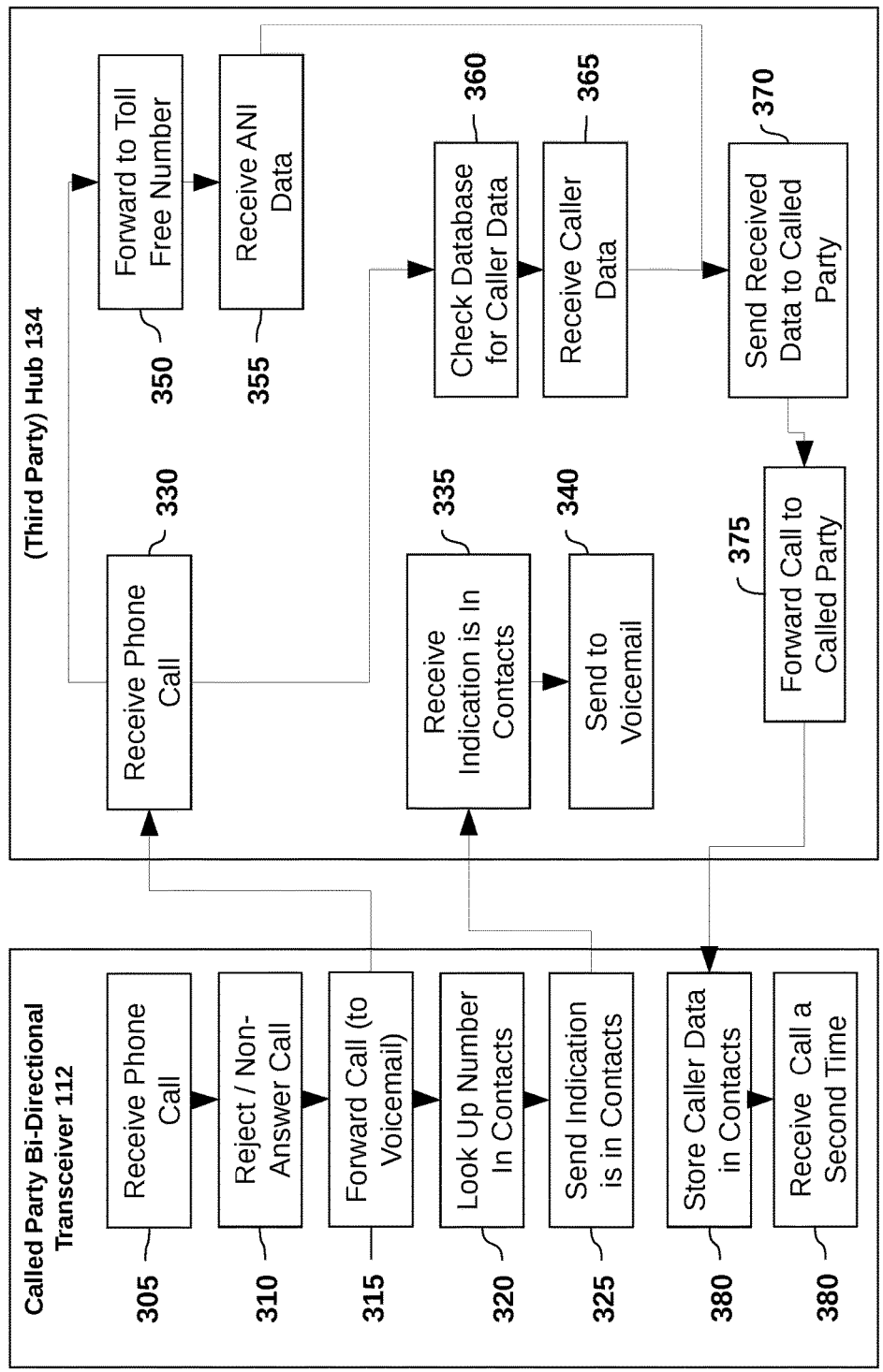
FIG. 3 is a high level flow chart depicting how methods of the disclosed technology are carried out.

FIG. 3 is a high level flow chart showing how methods of the disclosed technology can be carried out. The left box shows steps carried out by the called party device 112, whereas the right box shows steps carried out by a third party, such as the hub 134. The hub 134/third party can be a plurality of devices or parties acting together to carry out claimed steps of the technology. In step 305, a phone call is received. This call could be answered; however, in this disclosure, the call is rejected or goes unanswered in step 310, causing the call to be forwarded to the third party, such as by configuring a different number where voicemail is sent, in step 315. At this time (before, during, or after step 315) step 320 is carried out, where the number is used in a query to contact database stored on the called party device 112 (or sent to the called party device for temporary storage, even if it only comprises part of the database of contacts).

In step 325, it is determined that the number is in the contacts and, as such, the call should not be forwarded in reverse to the called party, or, it should only be forwarded in reverse if more data can be obtained about the calling party. The called party receives the call a second time—in some embodiments of the disclosed technology—in step 385, after storing the caller data in contacts of the device associated with the called party, in step 380, Thus, when the call is received (forwarded back) by the called party the second time, the device of the called party can now, or does now, display the contact information associated with the calling party after the number has been unmasked through use of the ANI protocol, and/or further data about the calling party have been obtained.

Now discussing the steps carried out by the third party/hub 134, the phone call is received in step 330 from the called party 112. This call can be forwarded to a non-inward WATS number (toll free) to unmask data related to the call in step 350. Or, simply, the full caller identification data (including name) can be retrieved. In addition, other databases (such as described above) can be checked for data in step 360, having data, such as photographs, related to the phone number of the calling party. Any and all of these data (name, picture, location, etc.) can be sent via a packet-switched network to the called party in step 370, where it is used to populate/store the data in a contact list database in step 380. The call is then forwarded to the called party such that the called party receives the call a second time; only this time, the called party device 112 can display more than just the number of the calling party (or no information about the calling party), but also the data received in steps 355, 365, or from the name portion of the calling line identification (CallerID) information. Now, the called party has more information about the calling party in the second call, compared to the first call.

Figure 4:
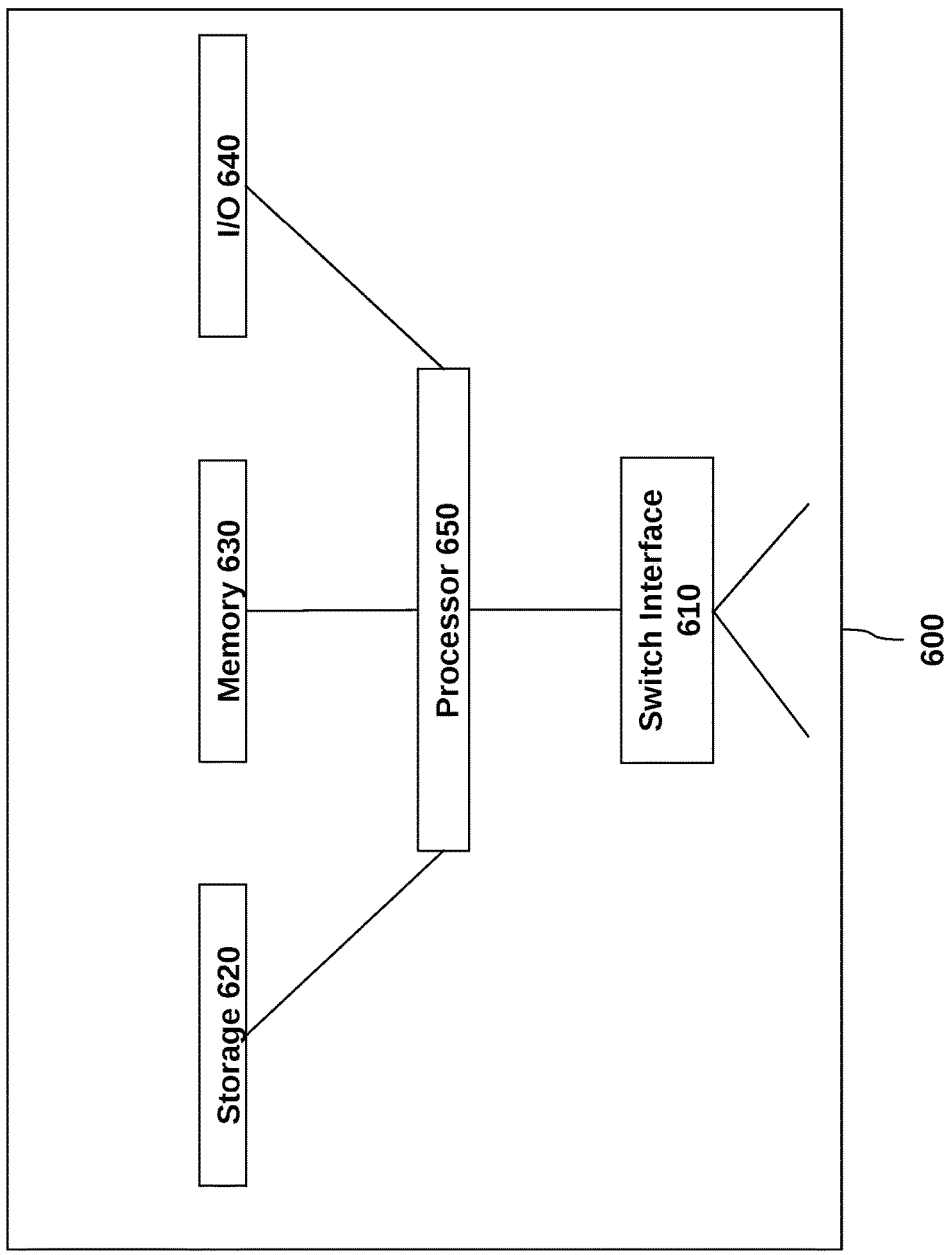
FIG. 4 shows a high-level block diagram of a device that may be used to carry out the disclosed technology.

FIG. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices, which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device, for illustrative purposes. It should also be understood by one skilled in the art that the method and devices depicted in FIGS. 1 through 3 may be implemented on a device such as is shown in FIG. 4.

Further, it should be understood that all subject matter disclosed herein is directed at, and should be read only on, statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of determining information associated with a calling party comprising, in order, the steps of:
   receiving a first phone call from said calling party to a handheld wireless device associated with a called party, wherein said handheld wireless device associated with said calling party fails to display a name associated with said called party;
   forwarding, via a first distinct forwarding, said phone call over a phone network to a third party service provider;
   receiving contact data from said third party service provider comprising at least one of a phone number, said name, and address of said calling party;
   populating a contact list database stored on said handheld wireless device associated with said called party with at least some of said contact data after said first phone call and before a second phone call from said calling party to said called party; and
   receiving said second separate phone call from said first phone call requiring a second distinct opening of a communication channel from said calling party to said handheld wireless device associated with said called party;
   wherein said handheld wireless device associated with said called party displays more contact data and includes said name in response to receiving said second phone call than when receiving said first phone call due to said step of populating said contact list database;
   wherein during said first phone call and said second phone call to said called party a single communication channel between a device associated with said calling party and a telephone network remains open;
   and wherein said second phone call is received based on said first phone call being forwarded back to said handheld wireless device associated with said called party by said third party service provider without said calling party having knowledge of said call being forwarded back.

2. The method of claim 1, wherein said calling party disconnects from said first phone call before making said second phone call; and
   said step of populating takes place after said first phone call is received, but before said second phone call is received to said handheld wireless device associated with said called party.

3. The method of claim 1, wherein said first distinct forwarding is a forwarding to voicemail based on rejection of said call by said called party.

4. The method of claim 3, wherein said first distinct forwarding is further based on unsatisfactory calling number identification information.

5. The method of claim 1, wherein said step of populating a contact list database is carried out with Automatic Number Identification (ANI) information associated with said calling party.

6. The method of claim 1, wherein said receiving data is via a packet-switched data network connection after said first phone call and before said second phone call over a telephone network.

7. The method of claim 1, wherein, after said second phone call is completed, said handheld wireless device associated with said called party prompts a user thereof to permanently save said contact data in said contact list or delete said contact data from said contact list.

8. The method of claim 1, wherein, after said second phone call is completed, said contact data are deleted from said contact list.

9. The method of claim 7, wherein, after said second phone call is completed, said contact data are deleted from said contact list by way of a selection of a prompt exhibited as a function of said second call ending.

10. A method of receiving a single phone call which appears to be two different phone calls from a perspective of a called party, comprising the steps of:
    receiving a first phone call to a device from a calling party over a communication channel and keeping said communication channel open throughout the following steps;
    receiving input into said device indicating a non-answering of said phone call, causing forwarding of said first phone call to a third party;
    receiving packet-switched data from said third party, indicating at least a name and phone number of said calling party;
    determining if said phone number is stored in contacts; and
    if said phone number is not found in said contacts, storing said phone number in said contacts and receiving a second phone call from said calling party;
    wherein said second phone call is received based on said first phone call being forwarded back to said handheld wireless device associated with said called party by said third party service provider without said calling party having knowledge of said call being forwarded back.

11. The method of claim 10, wherein, said phone number is found in said contacts, notifying said third party of same.

12. The method of claim 11, wherein upon said notifying said third party that said phone number is found in said contacts, said phone call is sent to voicemail.

13. The method of claim 10, wherein said first phone call and said second phone call are one continuous phone call from a perspective of said calling party, but two separately received calls from a perspective of said called party.

14. The method of claim 10, wherein said first phone call and said second phone call are two separate phone calls, each having different telephone network paths between said calling party and said called party, and said name associated with said calling party is displayed by said device upon receipt of said second phone call.

15. The method of claim 10, wherein said first distinct forwarding is further based on unsatisfactory calling number identification information.

16. The method of claim 10, wherein said names comprise data from Automatic Number Identification (ANI) information associated with said calling party.

17. The method of claim 10, wherein, after said second phone call is completed, said device associated with said called party prompts a user thereof to permanently save said phone number in said contacts or delete said contact data from said contacts.

18. The method of claim 10, wherein, after said second phone call is completed, said contact data are deleted from said contacts.

19. The method of claim 10, wherein, before said step of storing, said device associated with said called party displays less caller information than thereafter, and after said second phone call, said device associated with said called party displays at least some of said data stored in said contact database which was stored during said step of storing.

* * * * *